US007313487B2

(12) United States Patent
Yoshioka et al.

(10) Patent No.: US 7,313,487 B2
(45) Date of Patent: Dec. 25, 2007

(54) TRANSPIRED FUEL GAS LEAK DETECTING DEVICE

(75) Inventors: Hiroshi Yoshioka, Tokyo (JP); Tateki Mitani, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 221 days.

(21) Appl. No.: 10/557,425

(22) PCT Filed: Feb. 10, 2005

(86) PCT No.: PCT/JP2005/002025

§ 371 (c)(1), (2), (4) Date: Nov. 18, 2005

(87) PCT Pub. No.: WO2005/100772

PCT Pub. Date: Oct. 27, 2005

(65) Prior Publication Data

US 2007/0044549 A1 Mar. 1, 2007

(30) Foreign Application Priority Data

Apr. 6, 2004 (JP) ........................... P2004-111952

(51) Int. Cl.
*G01L 7/00* (2006.01)

(52) U.S. Cl. ........................................................ 702/51

(58) Field of Classification Search .................. 702/45, 702/50, 51
See application file for complete search history.

(56) References Cited

U.S. PATENT DOCUMENTS 6,523,398 B1 * 2/2003 Hanai et al. ............... 73/118.1
6,807,851 B2 * 10/2004 Wakahara et al. ......... 73/118.1
7,077,112 B2 * 7/2006 Mitani et al. ............... 123/518
2004/0200460 A1 * 10/2004 Mitani et al. ............... 123/520

FOREIGN PATENT DOCUMENTS

JP 10-104114 A 4/1998
JP 11-343929 A 12/1999
JP 2000-227054 A 8/2000
JP 2002-195107 A 7/2002
JP 2003-56416 A 3/2003

* cited by examiner

*Primary Examiner*—Michael Nghiem
(74) *Attorney, Agent, or Firm*—Sughrue Mion, PLLC

(57) ABSTRACT

A leak detecting system for a transpiration purge system including a fuel tank 1 and a canister 13 includes a jet pump 8, which leads the atmosphere into the fuel tank 1 using a return flow of excess fuel of fuel pumped to an internal combustion engine, internal pressure measuring means 15, and fuel volume detecting means 18. After intaking air via pressurizing means for a predetermined time, the leak detecting system judges that a leak is present when a holding pressure measurement value in a state in which the transpiration purge system is closed is lower than a decompression calculation value calculated from a pressurization measurement value, an air volume, and a leak hole diameter.

10 Claims, 3 Drawing Sheets

| | BEFORE START | TANK PRES-SURIZATION | PRESSURE MAINTENANCE | AFTER END |
|---|---|---|---|---|
| PURGE VALVE | CLOSED (OPEN) | CLOSED | CLOSED | CLOSED |
| VENT VALVE | OPEN | OPEN | CLOSED | OPEN |
| ORVR SHUT-OFF VALVE | OPEN | CLOSED | OPEN | OPEN |
| OUTSIDE AIR LEAD-IN VALVE | CLOSED | OPEN | CLOSED | CLOSED |

| | BEFORE START | TANK PRES-SURIZATION | PRESSURE MAINTENANCE | TANK INTERNAL PRESSURE RELEASE | SEALING | AFTER END |
|---|---|---|---|---|---|---|
| PURGE VALVE | CLOSED (OPEN) | CLOSED | CLOSED | CLOSED (OPEN) | CLOSED | CLOSED |
| VENT VALVE | OPEN | OPEN | CLOSED | OPEN | CLOSED | OPEN |
| ORVR SHUT-OFF VALVE | OPEN | CLOSED | OPEN | OPEN | OPEN | OPEN |
| OUTSIDE AIR LEAD-IN VALVE | CLOSED | OPEN | CLOSED | CLOSED | CLOSED | CLOSED |

| | BEFORE START | SEALING | TANK PRES-SURIZATION | PRESSURE MAINTENANCE | AFTER END |
|---|---|---|---|---|---|
| PURGE VALVE | CLOSED (OPEN) | CLOSED | CLOSED | CLOSED | CLOSED |
| VENT VALVE | OPEN | CLOSED | OPEN | CLOSED | OPEN |
| ORVR SHUT-OFF VALVE | OPEN | OPEN | CLOSED | OPEN | OPEN |
| OUTSIDE AIR LEAD-IN VALVE | CLOSED | CLOSED | OPEN | CLOSED | CLOSED |

TRANSPIRED FUEL GAS LEAK DETECTING DEVICE

TECHNICAL FIELD

The present invention relates to a transpired fuel gas leak detecting device for an internal combustion engine for a vehicle.

BACKGROUND ART

A conventional transpired fuel gas leak detecting device described in a patent document 1 is constituted to judge presence of a leak according to whether an internal pressure of a fuel tank, which is measured after leading in an outside air from the outside of the fuel tank and pressurizing the fuel tank for a predetermined time in a state in which a transpiration purge system is closed during operation of an internal combustion engine, has reached a set value.

In general, leak diagnosis is performed under a stable operation conditions such as idling time or low speed operation time so as not to be affected by a change in an operation condition of an internal combustion engine. Thus, it is necessary to set a measurement time long in order to secure detection accuracy. In this case, the number of times of leak diagnosis to be completed during operation is reduced excessively because of the change in the operation condition of the internal combustion engine. As a device for solving this problem, a transpired fuel gas leak detecting device described in a patent document 2 is constituted to judge presence of a leak by measuring an increase value of an internal pressure of a fuel tank due to self-transpiration of fuel after a predetermined time in a state in which a transpiration purge system is closed after an engine is stopped and, then, comparing the increase value with a value in judgment value tables of pressure increase values stored in advance having air volumes in the fuel tank calculated from a fuel level gauge and fuel temperatures calculated from a temperature sensor in the tank as parameters.

Patent document 1: JP-A-2002-195107 (paragraphs 0018 to 0020, FIG. 1)

Patent document 2: JP-A-2003-56416 (paragraphs 0003, 0004, and 0034 to 0042, FIG. 1)

DISCLOSURE OF THE INVENTION

The conventional transpired fuel gas leak detecting device described in the patent document 1 performs leak judgment using an internal pressure of the tank after leading in an outside air and pressurizing the tank for a predetermined time. Thus, fluctuation in air intake and pressurization abilities of pressurizing means may affect the leak judgment to deteriorate judgment accuracy. In addition, a jet pump for transferring fuel in an auxiliary chamber to a main combustion chamber, which has been used conventionally, is used to pressurize the fuel tank. Thus, there is a problem in that 100 to 130 seconds are required for the pressurization, leak detection time for a transpired fuel gas is long, and, as a result, leak detection cannot be performed in many cases when idling time is not long enough. Since an increase in an internal pressure of the tank due to self-transpiration of fuel is not taken into account, a fall in judgment accuracy due to the increase in an internal pressure of the tank may be caused.

In the conventional transpired fuel gas leak detecting device described in the patent document 2, it is necessary to prepare and store in advance judgment value tables of pressure increase values that assume various combinations of air volumes and fuel temperatures in the fuel tank. Thus, a large capacity memory for storage is required. In addition, since a judgment value for a pressure increase value is determined according to only an air volume and a fuel temperature, a fall in judgment accuracy may be caused by fluctuation in a content of a low boiling point component in fuel. Moreover, since pressurization of the fuel tank is performed using a self-transpiration pressure of fuel with a low applied pressure, the detection time becomes long. In addition, since leak detection can be performed only while an engine is stopped, a fall in a detection frequency may be caused.

The invention has been devised in order to solve the problems described above and it is an object of the invention to provide a transpired fuel gas leak detecting device that has a high detection frequency and can perform leak detection accurately.

MEANS FOR SOLVING THE PROBLEMS

A transpired fuel gas leak detecting device according to the invention includes: a valve that is provided in an transpiration purge system including a canister, which extends from a fuel tank to an internal combustion engine, and is capable of controlling the transpiration purge system to close; pressurizing means that leads an outside air in the transpiration purge system and pressurizes the transpiration purge system; internal pressure measuring means that detects an internal pressure of the transpiration purge system; and fuel volume detecting means that detects a fuel volume in the fuel tank. The transpired fuel gas leak detecting device sets a decompression calculation value after a predetermined time, which is calculated using a pressurization measurement value measured by the internal pressure measurement means at the time when the transpiration purge system is brought into a closed state after sending air from the pressurizing means for a predetermined time, an air volume calculated by subtracting a fuel volume detected by the fuel volume detecting means from a capacity of the transpiration purge system set in advance, and an allowable leak hole diameter set in advance, as a judgment criteria pressure and judges that a leak is present on the basis of a holding pressure measurement value, which is measured by the internal pressure measuring means after a predetermined time from the state in which the transpiration purge system is closed, and the judgment criteria pressure.

ADVANTAGES OF THE INVENTION

In the invention, in leak detection for the transpiration purge system, the leak detection is performed according to a holding pressure measurement value after pressurization of the tank. Thus, fluctuation in air intake and pressurization abilities of a jet pump serving as the pressurizing means does not affect the leak judgment. This makes it possible to cause the transpired fuel gas leak detecting device to carry out highly accurate judgment at a high detection frequency. In addition, since it is possible to calculate a judgment criteria pressure from an expression, it is unnecessary to prepare and store judgment criteria pressure correction tables in various cases assumed in advance. Thus, it is possible to constitute the transpired fuel gas leak detecting device with a simple system.

BEST MODE FOR CARRYING OUT THE INVENTION

First Embodiment

FIG. 1 is a diagram of a transpired fuel gas leak detecting device in a first embodiment of the invention. FIG. 2 is a graph showing an open/close sequence of a transpiration purge system closure control valve and a temporal change in an internal pressure of a fuel tank.

In FIG. 1, gasoline supplied from a fuel pump 2 provided in a fuel tank 1 is filtered by a fuel filter 3, subjected to pressure control by a pressure regulator 4 to have a fixed pressure, supplied to an injector 6 through a fuel pipe 5, jetted from the injector 6 to an intake manifold 7, and burnt in a not shown internal combustion engine.

A jet pump 8 serving as pressurizing means in the fuel tank 1 is provided in an exhaust port of the pressure regulator 4 branched from the fuel pipe 5. One end of an outside air lead-in pipe 9 is connected to the jet pump 8 and the other end of the outside air lead-in pipe 9 is connected to a transpired gas pipe 11 via an outside air lead-in valve 10. The jet pump 8 is adapted to suck an outside air into the fuel tank 1 according to a Venturi action due to a gasoline flow.

One end of the transpired gas pipe 11 is connected to an ORVR (On-board Refueling Vapor Recovery) valve 12 set in an upper part of the fuel tank 1 and the other end of the transpired gas pipe 11 is connected to a canister 13. The transpired gas pipe 11 delivers air containing gasoline vapor, which is ejected when fuel is supplied to the fuel tank 1, to the canister 13 and prevents outflow of a transpired gas from a fuel supply hole (not shown). The ORVR valve 12 incorporates a float. When a fuel level has reached full, the float rises to block a passage and prevent inflow of fuel into the transpired gas pipe 11. An ORVR shut-off valve 14 is set between a connecting section for the outside air lead-in valve 10 of the transpired gas pipe 11 and the ORVR valve 12.

A tank internal pressure sensor 15, which measures a difference of pressures in the fuel tank 1 and the atmosphere, and a rollover valve 16, which closes at the time of abnormality such as the time of overturning of a vehicle body, are mounted in a section not immersed in gasoline in an upper part of the fuel tank 1. The rollover valve 16 is connected to the transpired gas pipe 11 via a two-way valve 17. When an internal pressure of the fuel tank 1 exceeds a positive injection-valve opening pressure or a negative injection-valve opening pressure set by the two-way valve 17, the rollover valve 16 communicates with the canister 13 to control the pressure in the fuel tank 1 to be in a set range. As an example of an injection-valve opening pressure of the two-way valve 17, a positive pressure side is set to 6 kPa and a negative pressure side is set to −1 kPa. A fuel level gauge 18 for detecting a fuel volume is provided in the fuel tank 1.

A fuel transpired gas generated in the fuel tank 1 is absorbed by activated carbon in the canister 13. Only the air is emitted to the atmosphere from a vent valve 19. In order to prevent absorption of the activated carbon from being saturated, a purge valve 20 connected to the intake manifold 7 is opened to suck an outside air from the vent valve 19 with a negative pressure in the intake manifold 7 and refresh the activated carbon.

The outside air lead-in valve 10, the ORVR shut-off valve 14, the vent valve 19, the purge valve 20, the tank internal pressure sensor 15, and the fuel level gauge 18 are connected to a CPU of a fuel injection device. The CPU performs open/close control for the respective valves and sensing for the tank internal pressure sensor 15 and the fuel level gauge 18.

A leak detection operation in the transpired fuel gas leak detecting device constituted in this way will be explained with reference to a graph showing an open/close sequence of a transpiration purge system closure control valve and a temporal change in an internal pressure of a fuel tank. In an usual state before starting the leak detection operation, the purge valve 20 is in a closed state. However, when the activated carbon in the canister 13 is refreshed, the purge valve 20 is in an open state. The vent valve 19 and the ORVR shut-off valve 14 are in an open state and can lead a transpired gas in the fuel tank 1 to the canister 13. Since the outside air lead-in valve 10 is in a closed state and the jet pump 8 cannot suck an outside air, an internal pressure of the tank does not rise.

The leak detection operation is performed in two steps, tank pressurization and pressure maintenance. In a tank pressurization operation, the transpired fuel gas leak detecting device brings the purge valve 20 and the ORVR shut-off valve 14 into a closed state and brings the vent valve 19 and the outside air lead-in valve 10 into an open state. In this state, since the jet pump 8 sucks the outside air into the fuel tank 1 from the vent valve 19 via the canister 13, it is possible to perform the tank pressurization. An upper limit value P0 of the tank pressurization is set in a range (e.g., 2.5 kPa) not exceeding the positive injection-valve opening pressure of the two-way valve 17. Therefore, it is possible to prevent the air in the fuel tank 1 from escaping from the rollover valve 16 to the transpired gas pipe 11 through the two-way valve 17. The transpired fuel gas leak detecting device monitors a pressure in the fuel tank 1 with the tank internal pressure sensor 15. When the pressure exceeds the upper limit value P0 of the tank pressurization or a set time T elapses, the transpired fuel gas leak detecting device stops the tank pressurization operation and shifts to the subsequent pressure maintenance operation. As the set time T1, it is possible to set time required for the pressure to reach the upper limit value P0 of the tank pressurization to about 10 seconds by using a jet pump adjusted for air intake and pressurization rather than a jet pump for fuel transport. Any jet pump may be used as long as the jet pump has a performance of pressurizing the tank to 2.0 kPa in 10 seconds. It has been found that, for example, when a flow rate of an excess fuel from a fuel delivery system (not shown) on an input side of the jet pump is set to 100 litters/h and an inner diameter of a blast nozzle is set to 1.3 mm, an inner diameter of an exhaust port, in a recessed portion of which the blast nozzle is located, only has to be set to 4.5 mm to 6.5 mm and a ratio of a diameter of a driving flow nozzle in the inside and a diameter of the exhaust port only has to be set in a range of about 1:35 to 1:5.

In the pressure maintenance operation, the transpired fuel gas leak detecting device brings the outside air lead-in valve 10 into a closed state to stop intake of the outside air by the jet pump 8 and, then, brings the purge valve 20 and the vent valve 19 into a closed state to bring the transpiration purge system from the canister 13 to the fuel tank into a sealed state. Subsequently, the transpired fuel gas leak detecting device brings the ORVR shut-off valve 14 into an open state to spread the pressurized air in the fuel tank 1 to the transpired gas pipe 11 and the canister 13. Since an internal pressure of the tank at this point decreases from P0 to P1, the transpired fuel gas leak detecting device stores P1 as a pressurization measurement value for leak detection. In other words, the air in the fuel tank pressurized by the jet pump 8 to the pressure P0 flows into internal spaces of the transpired gas pipe 11, the canister 13, the outside air lead-in pipe 9, and the like, which are at the atmospheric pressure during the pressurization, to come into an equilibrium state. An internal pressure at this point is the pressure P1. After maintaining this state until a set time T2, the transpired fuel gas leak detecting device measures an internal pressure of the tank again and stores the internal pressure as a holding pressure measurement value P2. It is possible to set a set time from the pressurization measurement until the holding pressure measurement (T2−T1) to, for example, about 10 seconds. Finally, the transpired fuel gas leak detecting device brings the vent valve 19 and the ORVR shut-off valve 14 into an open state to release the internal pressure of the bank to thereby end the leak detection operation. It is possible to complete the series of the leak detection operation in about 20 seconds.

Next, a method of judging leak detection will be explained. A decompression calculation value Pt, which is calculated using an air volume V value calculated by subtracting a fuel volume calculated by the fuel level gauge 18 from a capacity of the transpiration purge system set in advance, an allowable leak hole diameter d set in advance (an area of a leak part assumed to be equivalent to a hole with a diameter d), a pressurization measurement value P1, and a set time from pressurization measurement to holding pressure measurement (T2−T1), is used as a judgment criteria pressure. It is possible to represent the decompression calculation value Pt with the following expression.

$$Pt = \frac{4}{\left(\frac{\pi \cdot d^2}{4 \cdot V} \cdot \sqrt{\frac{2}{\rho}} \cdot (T2 - T1) + \sqrt{\frac{4}{P1}}\right)^2} \quad \text{[Numeral 2]}$$

ρ indicates an air density, which is affected by temperature and an atmospheric pressure. However, a value 1.293 $kg/m^3$ in a standard state (0° C., 101.3 kPa) may be used within a range of an environment of use of a vehicle. A tank internal temperature sensor may be set to perform air density correction by combining a detected value of the tank internal temperature sensor with a detected value of the tank internal pressure sensor 15.

The transpired fuel gas leak detecting device performs the leak judgment by comparing the holding pressure measurement value P2 with the judgment criteria pressure and judges that a leak is present when the holding pressure P2 is smaller than the decompression calculation value Pt.

Note that the transpired fuel gas leak detecting device may compare a ratio (P1−P2)/P1 of a decompression amount measurement value (P1−P2), which is calculated by subtracting the holding pressure measurement value P2 from the pressurization measurement value P1, and the pressurization measurement value P1 and a ratio (P1−Pt)/P1 of a decompression amount calculation value (P1−Pt), which is calculated by subtracting the decompression calculation value Pt from the pressurization measurement value P1, and the holding pressure measurement value P1, and judge that a leak is present when (P1−P2)/P1 is larger than (P1−Pt)/P1.

The transpired fuel gas leak detecting device in the first embodiment performs the leak judgment using a holding pressure measurement value after tank pressurization. Thus, fluctuation in intake and pressurization abilities of the jet pump 8 serving as the pressurizing means does not affect the leak judgment and does not deteriorate judgment accuracy. Since a judgment criteria pressure can be calculated from an expression, the transpired fuel gas leak detecting device has an operational effect that, compared with the case in which judgment criteria pressure correction tables in various cases assumed in advance are prepared and stored, it is possible to improve accuracy of detection and both the conflicting characteristics of short time and accuracy are satisfied. In addition, since it is unnecessary to prepare and store judgment criteria pressure correction tables in various cases assumed in advance, a large capacity memory for storage is unnecessary. Moreover, since the jet pump adjusted for air intake and pressurization is used as the pressurizing means, it is possible to reduce a leak detection time (about twenty seconds) and improve a detection frequency. Since leak detection is possible during idling of an internal combustion engine, it is possible to improve a leak detection frequency.

Second Embodiment

In a second embodiment, improvement of detection accuracy is realized by adding means for correcting an influence of pressure increase due to self-transpiration of fuel in a tank to the leak detection method in the first embodiment. Since a constitution of a transpired fuel gas leak detecting device in the second embodiment is identical with that shown in FIG. 1 explained in the first embodiment, an explanation of the constitution is omitted. FIG. 3 is a graph showing an open/close sequence of a transpiration purge system closure control valve and a temporal change in an internal pressure of a fuel tank in the second embodiment of the invention. A leak detection operation will be explained with reference to the figure.

The leak detection operation is performed in four steps, tank pressurization, pressure maintenance, tank internal pressure release, and sealing. An operation from the tank pressurization to the pressure maintenance is identical with that in the first embodiment. An operation from the tank internal pressure release to the sealing is added after the operation. In the tank internal pressure release operation, the transpired fuel gas leak detecting device brings the vent valve 19 and the ORVR shut-off valve 14 into an open state from a pressure holding state to release an internal pressure of the tank. When a set time T3 elapses and the internal pressure of the tank falls to the atmospheric pressure, the transpired fuel gas leak detecting device ends the tank internal pressure release operation and shifts to pressure re-holding.

In a sealing operation, the transpired fuel gas leak detecting device brings the vent valve 19 into a closed state while keeping a closed state of the purge valve 20 and the outside air lead-in valve 10 and an open state of the ORVR shut-off valve 14 and brings the transpiration purge system from the canister 13 to the fuel tank 1 into a sealed state. After holding this state until a set time T4, the transpired fuel gas leak detecting device measures an internal pressure of the tank and stores the internal pressure as a fuel self-transpiration pressure measurement value P3. A sealing time for fuel self-transpiration pressure measurement is set to be identical with the pressure holding time (T2−T1) for holding pressure measurement. Finally, the transpired fuel gas leak detecting device brings the vent valve 19 and the ORVR shut-off valve 14 into an open state to release the internal pressure of the tank to thereby end the leak detection operation. It is possible to complete the series of the leak detection operation in about thirty seconds.

Next, a method of judging leak detection will be explained. The decompression calculation value Pt explained in the first embodiment is used for a judgment criteria pressure. The transpired fuel gas leak detecting device performs the judgment by comparing a holding pressure correction value (P2−P3), which is calculated by subtracting the fuel self-transpiration pressure measurement value P3 from the holding pressure measurement value P2 after tank pressurization, with the judgment criteria pressure and judges that a leak is present when the holding pressure correction value (P2−P3) is smaller than the decompression calculation value Pt.

Note that the transpired fuel gas leak detecting device may compare a ratio {P1−(P2−P3)}/P1 of a decompression amount correction value {P1−(P2−P3)}, which is calculated by subtracting the holding pressure correction value (P2−P3) from the pressurization measurement value P1, and the pressurization measurement value P1 and a ratio (P1−Pt)/P1 of the decompression amount calculation value (P1−Pt), which is calculated by subtracting the decompression calculation value Pt from the pressurization calculation value P1, and the holding pressure measurement value P1 and judge that a leak is present when {P1−(P2−P3)}/P1 is larger than (P1−Pt)/P1.

The transpired fuel gas leak detecting device in the second embodiment performs the leak judgment by correcting a holding pressure measurement value after tank pressurization with a fuel self-transpiration pressure measurement value. Thus, fluctuation in a fuel self-transpiration pressure, which changes because of influences of a fuel temperature, an air volume in a fuel tank, a content of a low boiling point component in fuel, and the like, does not affect leak judgment. It is possible to improve judgment accuracy. The transpired fuel gas leak detecting device has an operational effect that, compared with the case in which judgment criteria pressure correction tables in various cases assumed in advance are prepared and stored, it is possible to improve accuracy of detection and both the conflicting characteristics of short time (within thirty seconds) and accuracy are satisfied. In addition, in the leak detection operation, since fuel self-transpiration pressure measurement is performed after pressurization by the jet pump 8, it is possible to correct self-transpiration including an influence of an increase in self-transpiration of fuel due to a jet flow from the jet pump 8. Thus, it is possible to improve accuracy of leak detection. Further, the leak measurement time (T2−T1) and the self-transpiration pressure measurement time (T4−T3) are set equal (about ten seconds). This makes it possible to correct an influence due to self-transpiration, which increases as time elapses, and makes correction due to a difference of both measurement times unnecessary. As a result, calculation is easy.

Third Embodiment

In a third embodiment, the tank internal pressure release operation involved in the fuel self-transpiration pressure measurement in the leak detection method in the second embodiment is not performed to realize a reduction in a detection time. Since a constitution of a transpired fuel gas leak detecting device in the third embodiment is identical with that shown in FIG. 1 explained in the first embodiment, an explanation of the constitution is omitted. FIG. 4 is a graph showing an open/close sequence of a transpiration purge system closure control valve and a temporal change in an internal pressure of a fuel tank in the third embodiment of the invention. A leak detection operation will be explained with reference to the figure.

The leak detection operation is performed in three steps, sealing, tank pressurization, and pressure maintenance. An operation from the tank pressurization to the pressure maintenance in the latter half is identical with that in the first embodiment. A sealing operation is added before the operation. In the first sealing operation, the transpired fuel gas leak detecting device brings the purge valve 20 and the vent valve 19 into a closed state from a state before start of leak detection and brings the transpiration purge system from the canister 13 to the fuel tank 1 into a sealed state. After holding this state until a set time T0, the transpired fuel gas leak detecting device measures an internal pressure of the tank and stores the internal pressure as a fuel self-transpiration pressure measurement value P3. A sealing time (T0−T3) for fuel self-transpiration pressure measurement is set to be identical with the pressure holding time (T2−T1) for holding pressure measurement. Subsequently, the transpired fuel gas leak detecting device brings the vent valve 19 into an open state, brings the ORVR shut-off valve 14 into a closed state, and brings the outside air lead-in valve 10 into an open state while keeping the purge valve 20 in the closed state and shifts to a tank pressurization operation. An operation after this is identical with that in the first embodiment.

A method of judging leak detection is identical with that in the second embodiment. The decompression calculation value Pt explained in the first embodiment is used for a judgment criteria pressure. The transpired fuel gas leak detecting device performs judgment by comparing a holding pressure correction value (P2−P3), which is calculated by subtracting the fuel self-transpiration pressure measurement value P3 from the holding pressure measurement value P2, with the judgment criteria pressure and judges that a leak is present when the holding pressure correction value (P2−P3) is smaller than the decompression calculation value Pt.

Note that the transpired fuel gas leak detecting device may compare a ratio {P1−(P2−P3)}/P1 of a decompression amount correction value {P1−(P2−P3)}, which is calculated by subtracting the holding pressure correction value (P2−P3) from the pressurization measurement value P1, and the pressurization measurement value P1 and a ratio (P1−Pt)/P1 of the decompression amount calculation value (P1−Pt), which is calculated by subtracting the decompression calculation value Pt from the pressurization calculation value P1, and the holding pressure measurement value P1 and judge that a leak is present when {P1−(P2−P3)}/P1 is larger than (P1−Pt)/P1.

The transpired fuel gas leak detecting device in the third embodiment performs the fuel self-transpiration pressure measurement in the beginning of the leak detection operation. This makes it unnecessary to perform a tank internal pressure release operation beforehand and makes it possible to reduce a leak detection time because the tank internal pressure release operation is not performed.

DESCRIPTION OF REFERENCE NUMERALS

Figure 1:
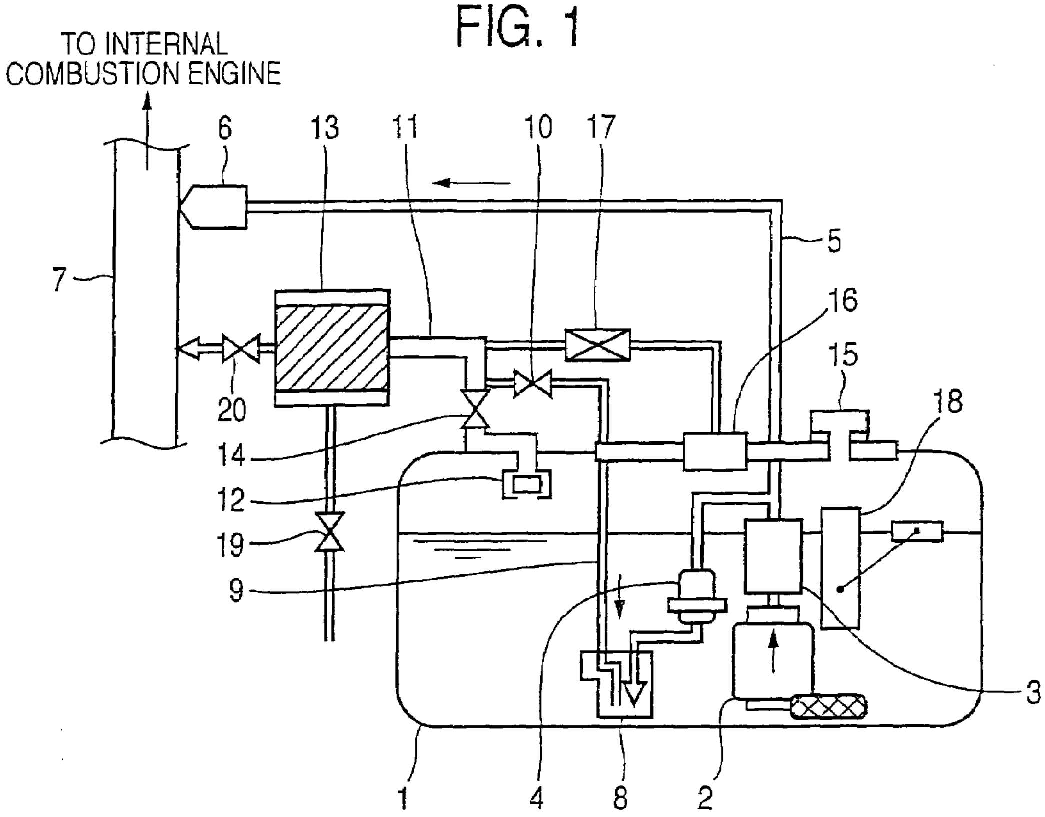
FIG. 1 is a diagram of a transpired fuel gas leak detecting device in a first embodiment of the invention.
Figure 2:
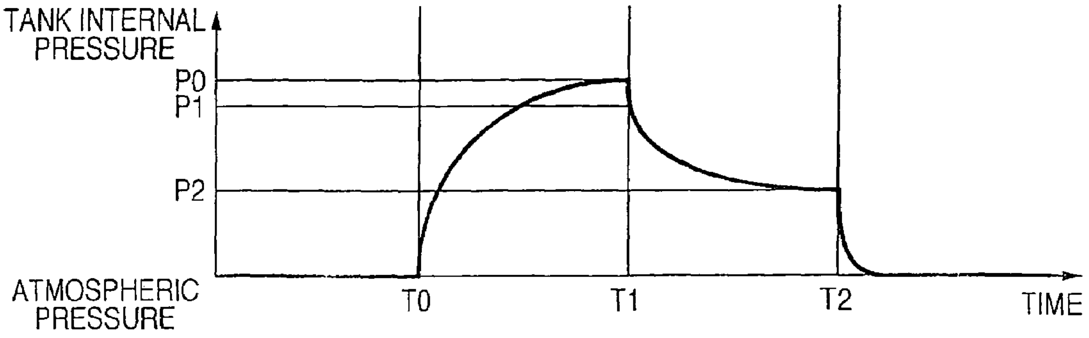
FIG. 2 is a graph showing an open/close sequence of a transpiration purge system closure control valve and a temporal change in an internal pressure of a fuel tank in the first embodiment.
Figure 3:
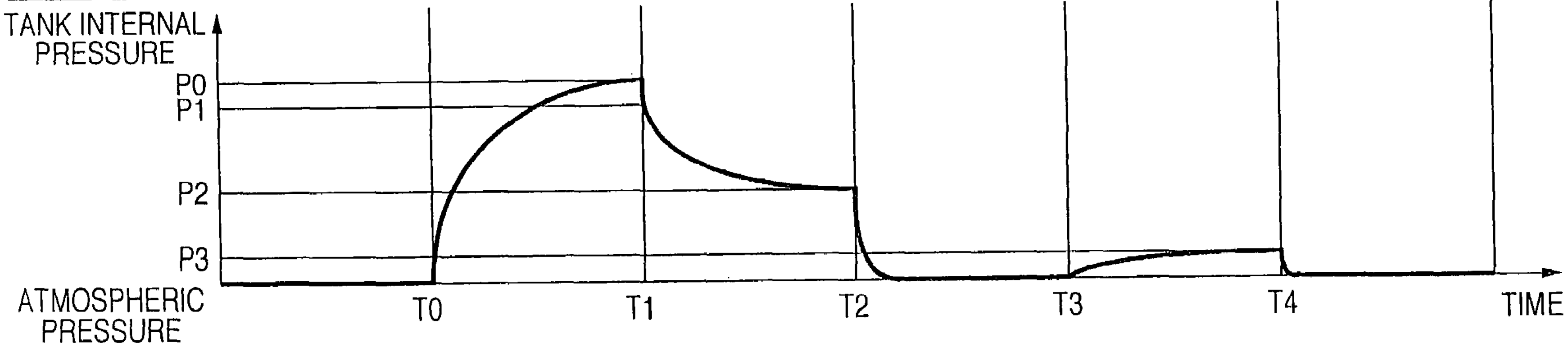
FIG. 3 is a graph showing an open/close sequence of a transpiration purge system closure control valve and a temporal change in an internal pressure of a fuel tank in the second embodiment.
Figure 4:
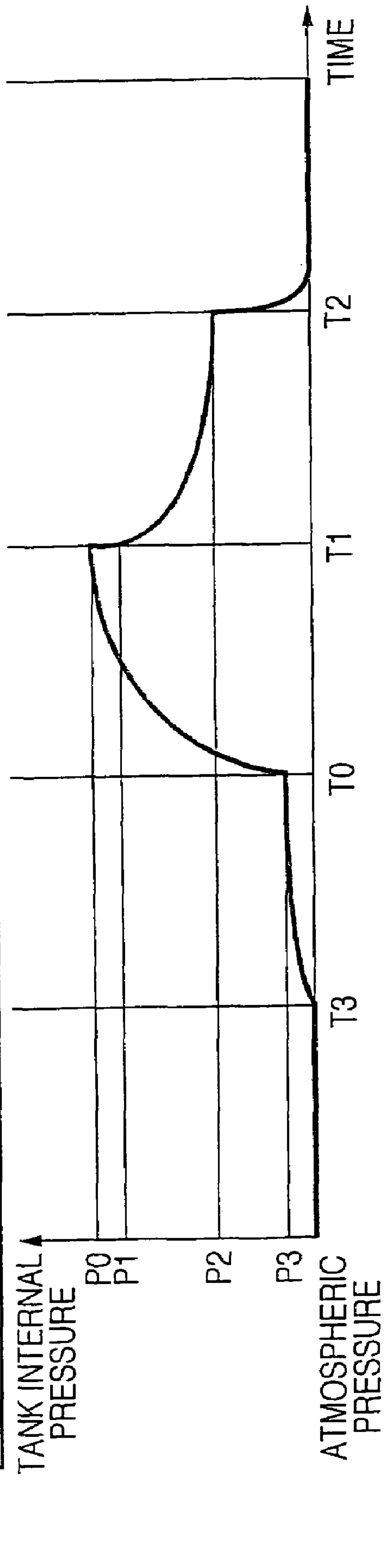
FIG. 4 is a graph showing an open/close sequence of a transpiration purge system closure control valve and a temporal change in an internal pressure of a fuel tank in the third embodiment.

1: Fuel tank, 8: jet pump, 9: outside air lead-in pipe, 10: outside air lead-in valve, 11: transpired gas pipe, 13: canister, 14: ORVR shut-off valve, 15: tank internal pressure sensor, 18: fuel level gauge, 19: vent valve, 20: purge valve

The invention claimed is:

1. A transpired fuel gas leak detecting device comprising: a valve that is provided in an transpiration purge system including a canister, which extends from a fuel tank to an internal combustion engine, and is capable of controlling the transpiration purge system to close;

pressurizing means that leads an outside air in the transpiration purge system and pressurizes the transpiration purge system;

internal pressure measuring means that detects an internal pressure of the transpiration purge system; and fuel volume detecting means that detects a fuel volume in the fuel tank;

wherein the transpired fuel gas leak detecting device sets a decompression calculation value after a predetermined time, which is calculated using a pressurization measurement value measured by the internal pressure measurement means at the time when the transpiration purge system is brought into a closed state after intaking air via from the pressurizing means for a predetermined time, an air volume calculated by subtracting a fuel volume detected by the fuel volume detecting means from a capacity of the transpiration purge system set in advance, and an allowable leak hole diameter set in advance, as a judgment criteria pressure and judges that a leak is present on the basis of a holding pressure measurement value, which is measured by the internal pressure measuring means after a predetermined time from the state in which the transpiration purge system is closed, and the judgment criteria pressure.

2. A transpired fuel gas leak detecting device according to claim 1, in which after causing the transpiration purge system to communicate with an outside air to have an atmospheric pressure, the transpired fuel gas leak detecting device stores a fuel self-transpiration pressure measurement value measured by the internal pressure measuring means after a predetermined time from a state in which the transpiration purge system is closed and, when a holding pressure correction value, which is calculated by subtracting the fuel self-transpiration pressure measurement value from the holding pressure measurement value, is lower than the judgment criteria pressure, judges that a leak is present.

3. A transpired fuel gas leak detecting device according to claim 2, wherein the predetermined time from the state in which the transpiration purge system is closed and the predetermined time from the state in which the transpiration purge system is closed are equal.

4. A transpired fuel gas leak detecting device according to claim 3, wherein the predetermined time is equal to or shorter than ten seconds.

5. A transpired fuel gas leak detecting device according to claim 2, wherein the transpired fuel gas leak detecting device calculates the self-transpiration pressure measurement value and, then, calculates the holding pressure measurement value.

6. A transpired fuel gas leak detecting device according to claim 1, wherein the pressurizing means is a jet pump that is capable of pressurizing the transpiration purge system from an atmospheric pressure to 2.0 kPa in ten seconds.

7. A transpired fuel gas leak detecting device according to claim 1, wherein the predetermined time from the state in which the transpiration purge system is closed is idling time of the internal combustion engine.

8. A transpired fuel gas leak detecting device according to claim 1, wherein the transpired fuel gas leak detecting device judges that a leak is present when the holding pressure measurement value is lower than the judgment criteria pressure.

9. A transpired fuel gas leak detecting device according to claim 1, wherein the calculated decompression calculation value after the predetermined time is calculated by the following expression:

$$Pt = \frac{4}{\left(\frac{\pi \cdot d^2}{4 \cdot V} \cdot \sqrt{\frac{2}{\rho}} \cdot (T2 - T1) + \sqrt{\frac{4}{P1}}\right)^2}$$

Pt: Decompression calculation value

P1: Pressurization measurement value d: Leak hole diameter

V: Air volume

T2–T1: Set time from pressurization measurement until holding pressure measurement ρ: Air density.

10. A transpired fuel gas leak detecting device according to claim 1, wherein the transpired fuel gas leak detecting device compares a ratio (P1–P2 )/P1 of a decompression amount measurement value (P1–P2 ), which is calculated by subtracting a holding pressure measurement value P2 from a pressurization measurement value P1, and the pressurization measurement value P1 and a ratio (P1–Pt)/P1 of a decompression amount calculation value (P1–Pt), which is calculated by subtracting a decompression calculation value Pt from the pressurization measurement value P1, and the pressurization measurement value P1, and judges that a leak is present when (P1–P2 )/P1 is larger than (P1–Pt)/P1.

* * * * *